US012682248B1

(12) United States Patent
Antebi et al.

(10) Patent No.: US 12,682,248 B1
(45) Date of Patent: Jul. 14, 2026

(54) DIRECT PREFERENCE OPTIMIZATION DATA FILTERING VIA ANSWER SIMILARITY USING LANGUAGE MODEL EMBEDDINGS

(71) Applicant: Intuit Inc., Mountain View, CA (US)

(72) Inventors: Sagiv Antebi, Tel Aviv (IL); Matan Vetzler, Tel Aviv (IL); Gidi Zilbar, Tel Aviv (IL); Ofir Ben Shoham, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/285,715

(22) Filed: Jul. 30, 2025

(51) Int. Cl.
| | |
|---|---|
| *G06N 5/02* | (2023.01) |
| *G06N 3/045* | (2023.01) |
| *G06N 3/0455* | (2023.01) |
| *G06N 3/0895* | (2023.01) |
| *G06N 5/04* | (2023.01) |

(52) U.S. Cl.
CPC ............. *G06N 3/0895* (2023.01); *G06N 5/04* (2013.01)

(58) Field of Classification Search
CPC ............................... G06N 3/0895; G06N 5/04
See application file for complete search history.

(56) References Cited

U.S. PATENT DOCUMENTS

| | | | | |
|---|---|---|---|---|
| 11,978,273 | B1 * | 5/2024 | Ramaswamy | ......... G06N 3/045 |
| 12,367,953 | B1 * | 7/2025 | Babu | ....................... G16H 50/70 |
| 2017/0032689 | A1 * | 2/2017 | Beason | .................... G09B 7/00 |
| 2019/0043497 | A1 * | 2/2019 | Georges | ............. G10L 15/1815 |
| 2019/0065576 | A1 * | 2/2019 | Peng | ....................... G06F 16/285 |
| 2022/0414344 | A1 * | 12/2022 | Makki Niri | ............. G06F 40/30 |
| 2023/0245418 | A1 * | 8/2023 | Zhang | .................... G06F 16/954 |
| | | | | 382/156 |
| 2023/0368557 | A1 * | 11/2023 | Kolavennu | ............. G06F 18/23 |
| 2025/0139375 | A1 * | 5/2025 | Bright | ..................... G06F 40/35 |

* cited by examiner

*Primary Examiner* — Brandon S Cole
(74) *Attorney, Agent, or Firm* — Dinsmore & Shohl LLP

(57) ABSTRACT

Disclosed herein are system, method, apparatus, and computer-readable medium embodiments for filtering data for direct preference optimization training via answer similarity using language model embeddings. A system inputs an accepted question-response pair and a rejected question-response pair into a language model. The system extracts a first embedding for the accepted question-response pair and a second embedding for the rejected question-response pair from the language model. Using the first embedding and the second embedding, the system further computes a similarity score for the accepted question-response pair and the rejected question-response pair. Finally, based on the similarity score satisfying a threshold, the system includes the rejected question-response pair in a dataset and trains the language model using the dataset.

20 Claims, 8 Drawing Sheets

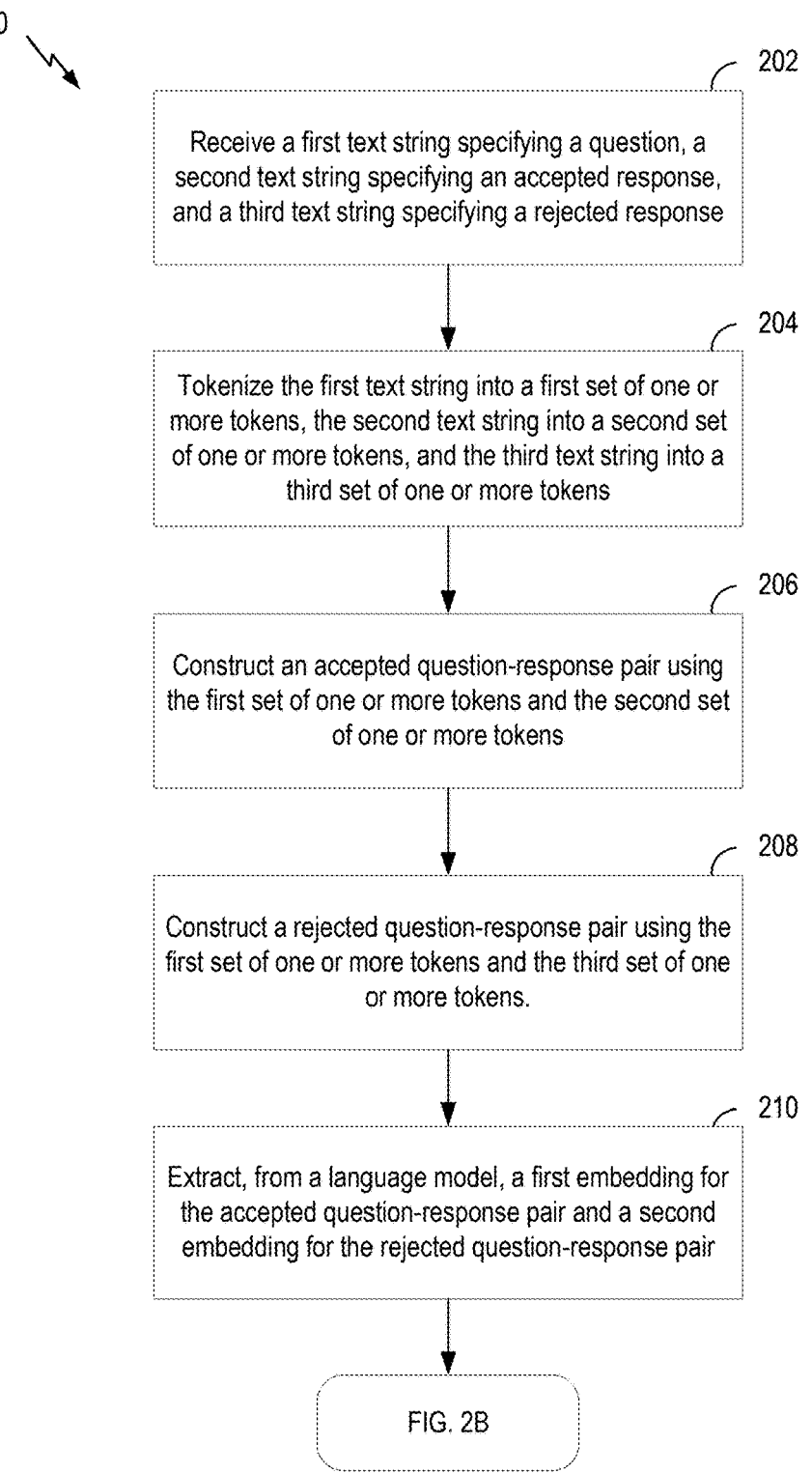

200

202

Receive a first text string specifying a question, a second text string specifying an accepted response, and a third text string specifying a rejected response

204

Tokenize the first text string into a first set of one or more tokens, the second text string into a second set of one or more tokens, and the third text string into a third set of one or more tokens

206

Construct an accepted question-response pair using the first set of one or more tokens and the second set of one or more tokens

208

Construct a rejected question-response pair using the first set of one or more tokens and the third set of one or more tokens.

210

Extract, from a language model, a first embedding for the accepted question-response pair and a second embedding for the rejected question-response pair

Figure 4:
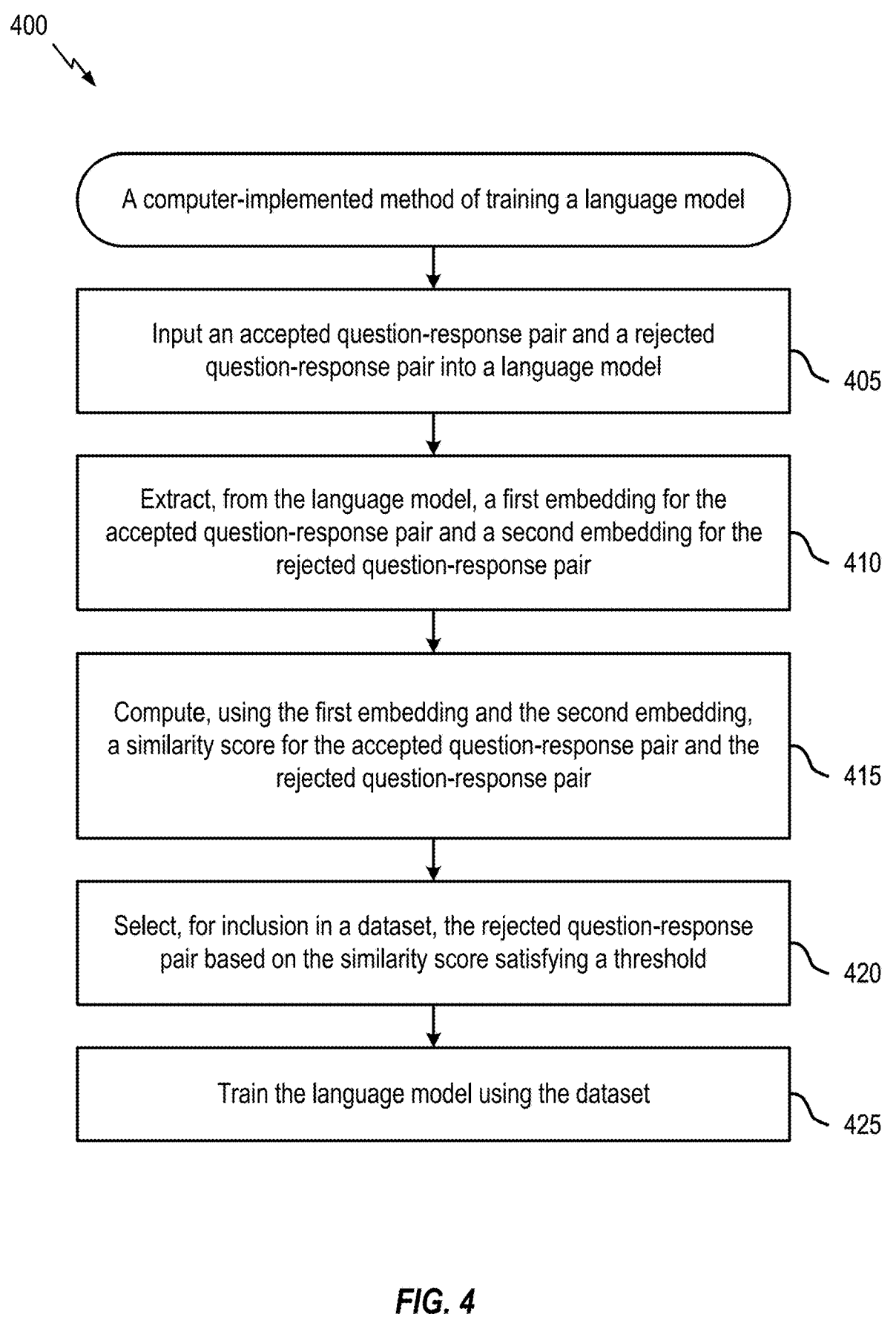

A computer-implemented method of training a language model

Input an accepted question-response pair and a rejected question-response pair into a language model — 405

Extract, from the language model, a first embedding for the accepted question-response pair and a second embedding for the rejected question-response pair — 410

Compute, using the first embedding and the second embedding, a similarity score for the accepted question-response pair and the rejected question-response pair — 415

Select, for inclusion in a dataset, the rejected question-response pair based on the similarity score satisfying a threshold — 420

Train the language model using the dataset — 425

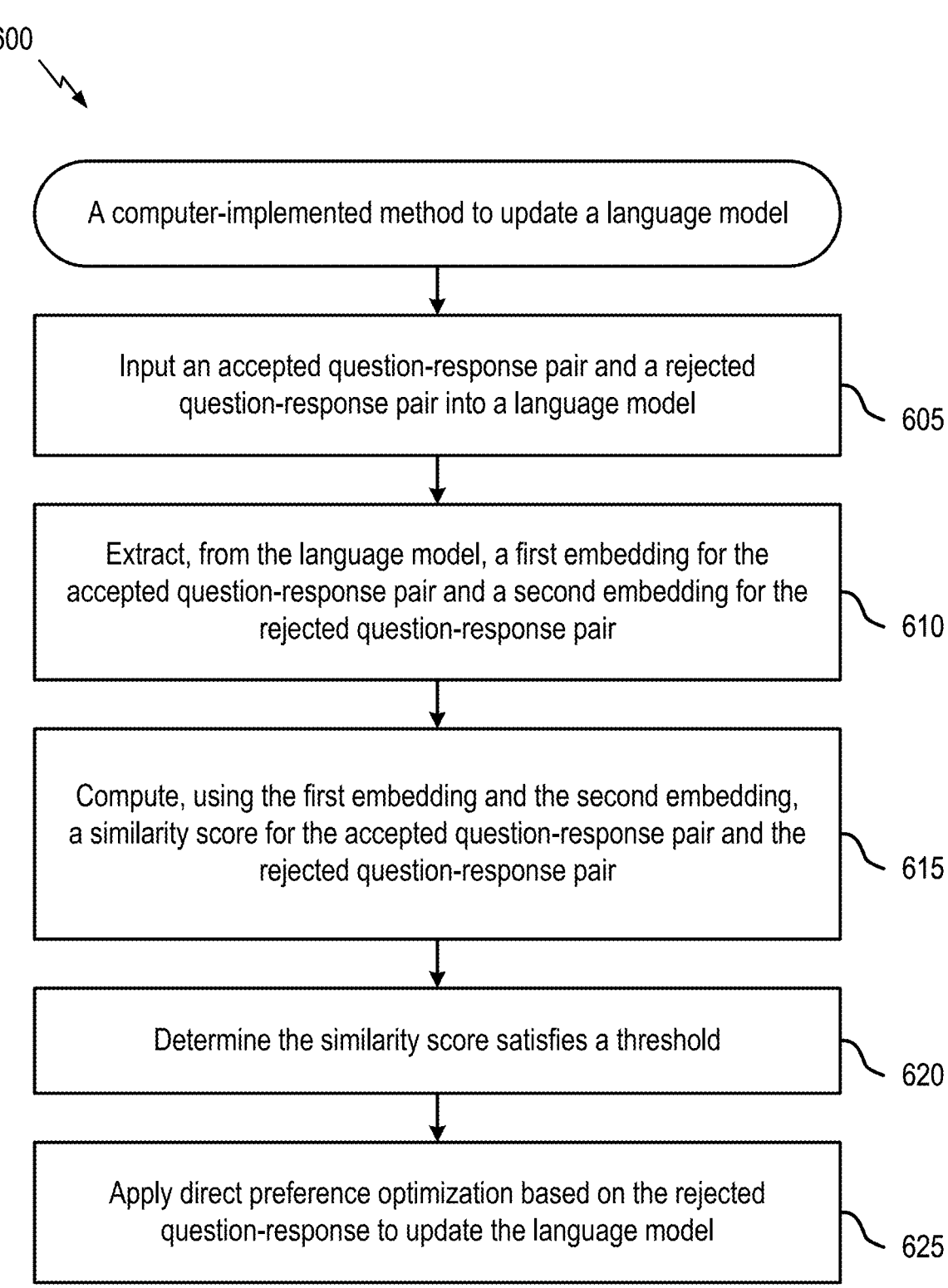

A computer-implemented method to update a language model

Input an accepted question-response pair and a rejected question-response pair into a language model — 605

Extract, from the language model, a first embedding for the accepted question-response pair and a second embedding for the rejected question-response pair — 610

Compute, using the first embedding and the second embedding, a similarity score for the accepted question-response pair and the rejected question-response pair — 615

Determine the similarity score satisfies a threshold — 620

Apply direct preference optimization based on the rejected question-response to update the language model — 625

Processor(s) 702

Input/Output Device(s) 704

Display Device(s) 706

Network Interface(s) 708

Bus 710

Computer-Readable Medium 712

Inputting Component 714

Extracting Component 716

Computing Component 718

Determining Component 720

Applying Component 722

DIRECT PREFERENCE OPTIMIZATION DATA FILTERING VIA ANSWER SIMILARITY USING LANGUAGE MODEL EMBEDDINGS

BACKGROUND

Field

Aspects of the present disclosure relate to filtering data for direct preference optimization training via answer similarity using language model embeddings.

Description of Related Art

A long-term goal of artificial intelligence (AI) is to create machines capable of understanding and engaging in conversation with humans using natural language. Dialogue systems, which can communicate with users in natural language, may conduct unstructured conversations, with users, on any topic (e.g., open-domain systems). Performant dialogue systems exhibit competence in understanding natural language, making informed decisions, and generating fluent, engaging, contextually appropriate, and accurate responses.

An example dialogue system may use language models, such as large language models (LLMs) or small language models (SLMs), to perform natural language processing (NLP) tasks. A language model is a type of machine learning (ML) model that supports NLP tasks, such as generating text, analyzing sentiments, answering user queries in a conversational manner, translating text from one language to another, and/or the like. Language models make it possible for software to "understand" typical human speech or written content and respond to it by, in some cases, generating human-understandable responses through natural language generation (NLG). An LLM is a type of language model that is trained using deep learning techniques to autonomously generate text like a human. LLMs typically have a large number of parameters (e.g., billions or, in some cases, trillions) that can be adjusted to optimize the process of tokenizing words into tokens and predicting the next token from a previous sequence of input tokens.

A popular LLM model architecture is a generative pre-trained transformer (GPT) model. A GPT model is based on a transformer architecture (e.g., architecture that uses an encoder-decoder structure and does not rely on recurrence and/or convolutions to generate an output), that is pre-trained in a generative and unsupervised manner (e.g., it learns from data without being given explicit instructions on what to learn). A GPT model analyzes prompts and predicts the best possible response based on their understanding of the language. In particular, the GPT model may rely on the knowledge it gains after its parameters are trained on massive datasets. As used herein, a "prompt" is an input (such as an instruction and/or request), posed in natural language, given to a computer program and/or language model. For example, the prompt may be given to cause the computer program or language model to perform a particular task and/or generate a specific output.

SUMMARY

Certain aspects provide a computer-implemented method that includes inputting an accepted question-response pair and a rejected question-response pair into a language model; extracting, from the language model, a first embedding for the accepted question-response pair and a second embedding for the rejected question-response pair; computing, using the first embedding and the second embedding, a similarity score for the accepted question-response pair and the rejected question-response pair; selecting, for inclusion in a dataset, the rejected question-response pair based on the similarity score satisfying a threshold; and training the language model using the dataset.

Certain aspects provide a method for wireless communications by an apparatus. The method includes inputting an accepted question-response pair and a rejected question-response pair into a language model; extracting, from the language model, a first embedding for the accepted question-response pair and a second embedding for the rejected question-response pair; computing, using the first embedding and the second embedding, a similarity score for the accepted question-response pair and the rejected question-response pair; selecting, for inclusion in a dataset, the rejected question-response pair based on the similarity score satisfying a threshold; and training the language model using the dataset.

Certain aspects provide a computer-implemented method that includes inputting an accepted question-response pair and a rejected question-response pair into a language model; extracting, from the language model, a first embedding for the accepted question-response pair and a second embedding for the rejected question-response pair; computing, using the first embedding and the second embedding, a similarity score for the accepted question-response pair and the rejected question-response pair; determining the similarity score satisfies a threshold; and applying direct preference optimization based on the rejected question-response to update the language model.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 4 depicts a method for training the language model, in accordance with aspects of the disclosure.

FIG. 6 depicts a method for updating the language model, in accordance with aspects of the disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
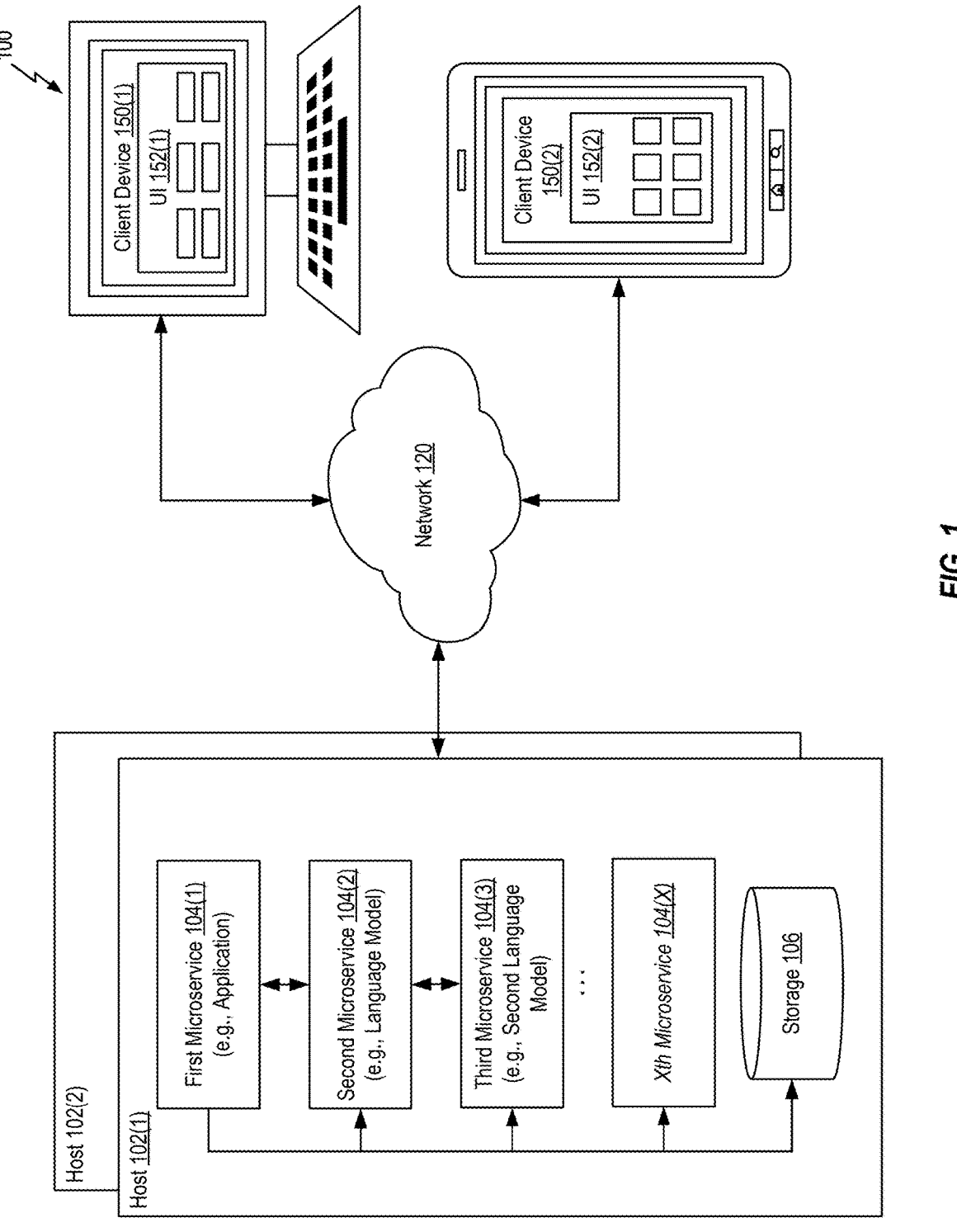
FIG. 1 illustrates an exemplary computing environment, in accordance with aspects of the disclosure.

Aspects of the present disclosure provide apparatuses, methods, processing systems, and computer-readable mediums for direct preference optimization data filtering via answer similarity using language model embeddings.

Large language models (LLMs) are deep learning models that are designed to autonomously generate text. LLMs rely on a transformer neural network architecture comprising multiple layers of neural networks, where each node, or computational unit, in a neural network layer is connected to nodes in subsequent neural network layers. Connections between nodes are associated with parameters, such as weights and biases that influence the output of other connected nodes. The transformer neural network architecture may allow for exceptionally large models that include hundreds of billions of parameters. This architecture may be trained using massive amounts of data from various sources from which they are able to learn grammar, semantics, and conceptual relationships. For training, an LLM (or preprocessor) tokenizes words into tokens, transforms the tokens into embeddings (e.g., numeric representations of tokens or their context), and iteratively adjusts parameter values. Based on these parameter values, the LLM predicts the next token from a previous sequence of input tokens. The LLM may further apply or be trained using self-learning techniques which teach the LLM to adjust parameters to maximize the likelihood of the next tokens in training examples.

However, controlling the training of an LLM according to human preferences can be difficult due to the unsupervised nature of LLM training. For example, a user may submit a mathematical question to a trained LLM. The LLM may respond with the correct answer or may respond with another question. In this scenario, both responses can be technically correct, but the user may not view them as equally useful. Existing methods to steer the training of an LLM to provide responses that align with human expectations include the use of reinforcement learning from human feedback (RLHF), which is a two-phase approach to optimizing an LLM using feedback from a separate reward model trained to act as a proxy for human feedback. In the human feedback phase of RLHF, a reward model is constructed using direct human feedback. For example, building a reward model requires: (1) prompting an LLM to produce a plurality of answers to one or more questions; (2) assigning a label (e.g., accepted or rejected etc.) to each answer of the plurality of answers based on ratings or scores provided by human evaluators; (3) creating a preference dataset comprising a plurality of question-accepted answer-rejected answer tuples using the one or more questions and the labeled answers; and (4) training, using the preference dataset, the reward model to assign a higher scores to preferred answers and lower scores to non-preferred answers. Furthermore, in the reinforcement learning phase of RLHF, internal parameters of the LLM are iteratively adjusted until the model can generate responses that maximize rewards predicted by the trained reward model and, by extension, closely align with human preferences.

Although RLHF can encourage an LLM to learn to output accurate and contextually relevant responses to questions that it receives, the approach carries significant limitations. For example, training a separate reward model in addition to the LLM is computationally expensive. Gathering enough human feedback necessary to train the reward model also takes time and can become a costly bottleneck to updating the LLM. Finally, using RLHF to finetune an LLM can be prone to errors such as reward hacking, where the LLM learns to exploit flaws or ambiguities in the reward model to achieve high rewards without genuinely learning or completing an intended task.

In light of the challenges associated with RLHF, direct preference optimization (DPO) has emerged as an alternative approach for finetuning LLMs. Rather than relying on reward models to optimize an LLM, DPO directly optimizes the LLM's output based on preferences expressed as pairs of accepted answers and rejected answers. DPO avoids the need for explicit reward modelling by working directly with examples of preferred and rejected responses based on a cross-entropy loss function ($\mathcal{L}_{DPO}$). DPO starts with a "base reference policy," which represents an initial finetuned model that serves as a baseline to prevent the LLM from drifting too far from reasonable behavior. During training, DPO compares the LLM's evolving behavior against this base reference policy using a mathematical technique called cross-entropy loss. The system looks at pairs of responses to the same question-one labeled as accepted, one as rejected- and adjusts the LLM parameters to make it more likely to produce responses like the accepted question/answer pair and less likely to produce responses like the rejected question/answer pair. By removing the need for a reward model, DPO is a faster, cheaper, and computationally lightweight approach to finetuning an LLM.

However, despite its advantages, DPO finetuning can be sensitive to the quality of the preference data submitted to it. In some scenarios, a preference dataset may include rejected answers to questions that are too dissimilar from the accepted answers to the same questions. If an accepted answer to a question and a rejected answer to the same question are too dissimilar, an LLM that is finetuned using DPO can struggle to learn the nuances of human preferences between the answers, which will impede updating of the language model policy to generate output that aligns with human expectations. Instead, DPO may steer the training of an LLM to learning overly obvious distinctions rather than meaningful refinements, leading to noisy updates and unstable training.

Aspects described herein provide techniques and apparatuses to address the above technical problem and others. Certain aspects of the present disclosure improve the efficacy of DPO finetuning of a language model, such as an LLM, by filtering rejected answers that are too dissimilar from the corresponding accepted answers from a preference dataset. The above solution achieves this objective by implementing an application that first extracts a first embedding for an accepted question-response pair and a second embedding for a rejected question-response pair from a last layer of an LLM. The application computes, using the first embedding and the second embedding, a similarity score for the accepted question-response pair and the rejected question-response pair. Based on the similarity score failing to satisfy a threshold, the application further removes or excludes the rejected question-response pair from the dataset. Notably, the LLM from which the embeddings are extracted is the same LLM that is being finetuned through DPO, which improves the relevance of the embeddings for the finetuning process.

The techniques and apparatuses for providing DPO data filtering via answer similarity using language model embeddings described herein may provide beneficial technical effects and/or advantages. For example, removing rejected answers having a low similarity to (or high gap with) corresponding accepted answers may reduce ambiguous supervision and enhance contrast in preference learning, leading to a stronger training signal, shortened training times, and improved model robustness. Shortened training times may facilitate additional downstream benefits in the technical field of machine learning by reducing requirements associated with training language models, including, but not limited to, the demand for computing processing resources, memory usage, and energy. Such technical effects may be attributable to techniques and apparatuses described herein, for example, due to an application discarding a rejected question-response pair based on a first embedding for the accepted question-response pair and a second embedding for the rejected question-response pair. Such an arrangement ensures that the continuous training or improvement of the language model aligns with human preferences and/or expectations.

Example Environment for DPO Data Filtering Via Answer Similarity Using Language Model Embeddings FIG. 1 depicts an example computing environment 100 supporting a plurality of microservices 104 (e.g., software-defined services, which in some cases, may be cloud-native). As shown in FIG. 1, system 100 includes client devices 150(1)-(2) (collectively referred to herein as "client device 150") and hosts 102(1)-(2) (collectively referred to herein as "host 102") interconnected through a network 120. Network 120 may be, for example, a direct link, a local area network (LAN), a wide area network (WAN), such as the Internet, another type of network, or a combination of one or more of these networks.

Host 102 may be geographically co-located servers on the same rack or on different racks in any arbitrary location in a data center. Host 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. Microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may enable segmented, granular level functionalities within a larger system infrastructure. Microservices 104 may specifically implement elements of a system for filtering DPO data via answer similarity using language model embeddings such as, but not limited to, an application (e.g., Microservice 104(1)) and a language model (e.g., Microservice 104(2)).

Client device 150 may be a desktop computer, laptop computer, tablet computer, smartphone, cellular telephone, personal digital assistant, or any other type of computing device. User interface 152 may comprise a graphical user interface (GUI) of a software application operating on client device 152. Software applications may include web browser applications that enable users to access content and resources located on remote servers using network 120. Some examples of web browser applications may include Google Chrome™, Mozilla Firefox™, Microsoft Edge™, Opera™, and Apple Safari™.

User interface (UI) 152 may comprise one or more GUI elements including, but are not limited to, an input element, a submission element, and an output element. The input element may be configured to receive distinct types of user-provided data including, but not limited to, one or more text strings, one or more audio files, or one or more image files. In some aspects, the one or more text strings may specify a search query or question that the user would like to have answered. The input element may be configured to receive the user-provided data from an input device such as keyboard, camera, microphone, or a voice-to-text program. The submission element may be a button (or other type of GUI element) configured to cause the user interface 152 to transmit the user-provided data to a microservice (e.g., one of the microservices 104 on host 102). The user interface 152 may transmit the user-provided data to the microservice instantly upon, or shortly after, receiving an indication of user interaction (e.g., click, toggle, etc.) with the submission element. The output element may be configured to receive and display a response from the microservice. A response may be a relevant, existing content item retrieved from a database by the microservice or a new content item generated by the microservice based on user-provided data, such as one or more text strings specifying an answer to a question previously posed by the user.

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two hosts 102 and two client devices 150, other examples may include more or fewer hosts 102 and/or client devices 150, and client devices 150 may use any combination of microservices 104 on any host 102 where microservices 104 are deployed.

Figure 2B:
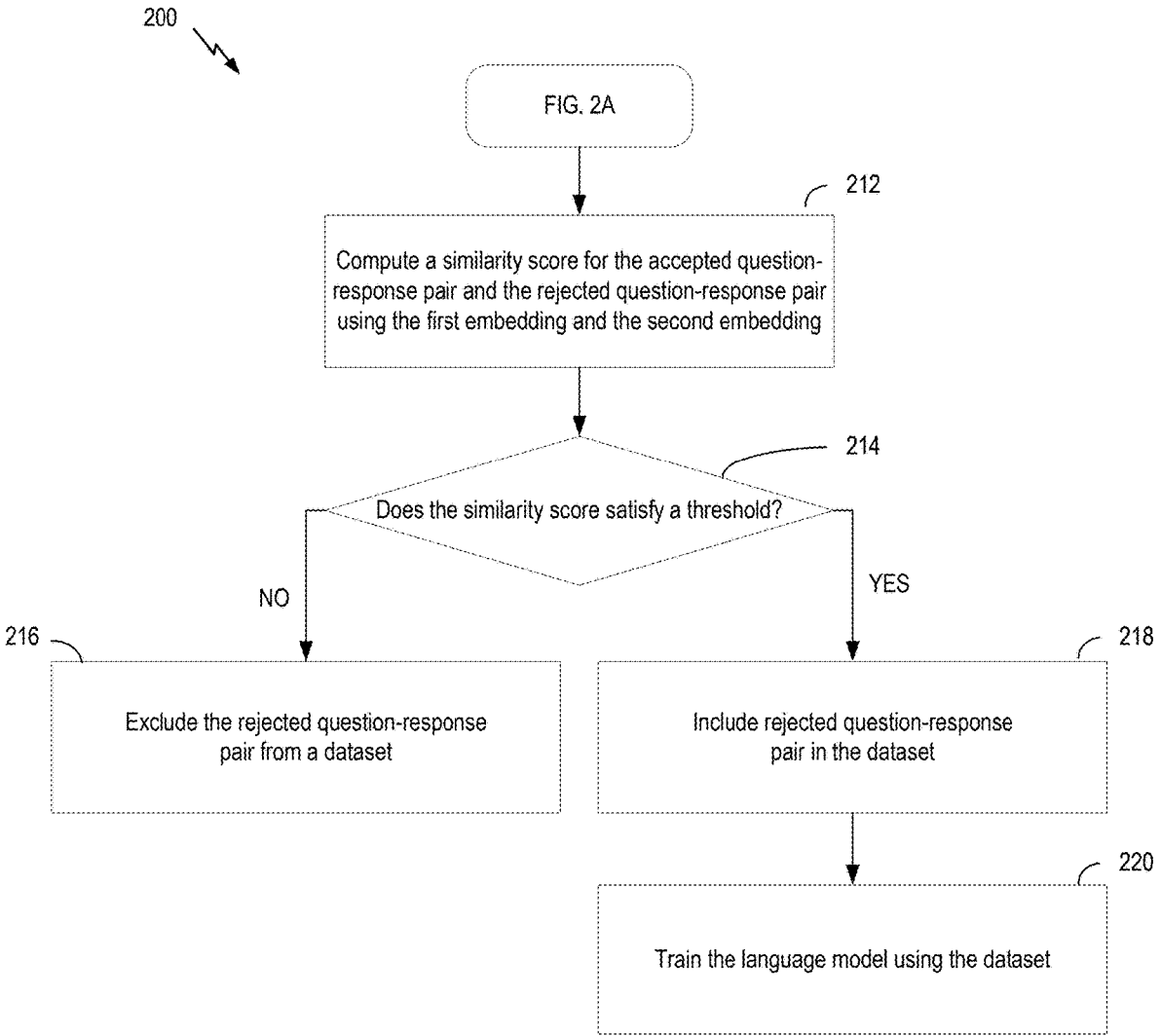
FIGS. 2A and B illustrate an example method for filtering training data via answer similarity using language model embeddings, in accordance with aspects of the disclosure.

FIGS. 2A and 2B display a flow diagram of an example method 200 for filtering training data via answer similarity using language model embeddings, in accordance with aspects of the disclosure. Method 200 may be performed by application 104(1) and language model 104(2) of FIG. 1. However, method 200 is not limited to that embodiment.

In FIG. 2A, method 200 may begin with block 202, which includes application 104(1) receiving a first text string specifying a question, a second text string specifying an accepted response, and a third text string specifying a rejected response. A question may comprise a general request for information about a subject, or a prompt describing a task to be completed, that is presented to language model 104(2) for processing. It should be noted that the aspects described herein are not limited to those in which the first text string is a question and can be applied for any sort of text string. An accepted response may comprise a content item (e.g., text, audio, image(s), etc.) selected from a set of one or more content items generated by the language model 104(2) upon receiving a question from a user interface, such as UI 152(1) or UI 152(2). In some aspects, the language model 104(2) may select, as the accepted response, a content item that best responds to the question based on at least one criterion, such as relevance, completeness, or coherence, from the set of one or more content items. A rejected response may comprise a content item that the language model 104(2) did not select as the accepted response from the set of one or more content items previously generated by language model 104(2). Application 104(1) may obtain the first, second, and third text strings from one or more data sources. The one or more data sources may include, but are not limited to, an input device, an interface (e.g., UI 152 of FIG. 1), a database (e.g., storage 106 of FIG. 1), or a language model (e.g., language model 104(2) of FIG. 1). For example, in some aspects, application 104(1) may receive the first text string from UI 152(1) and the second and third text strings from the language model 104(2). Alternatively, in other aspects, application 104(1) may receive the first, second, and third text strings from a database, such as storage 106.

Block 204 includes application 104(1) tokenizing the first text string into a first set of one or more tokens, the second text string into a second set of one or more tokens, and the third text string into a third set of one or more tokens. In some aspects, a token may comprise a word. In other aspects, a token may comprise a linguistic unit smaller than a word.

Block 206 includes application 104(1) constructing an accepted question-response pair using the first set of one or more tokens and the second set of one or more tokens. This step may be performed, for example, by associating the first set of tokens representing the question with the second set of tokens representing the accepted response and storing the pair as a linked entry in a database or data structure for DPO processing. Block 208 further includes application 104(1) constructing a rejected question-response pair using the first set of one or more tokens and the third set of one or more tokens. This step may be performed, for example, by associating the first set of tokens representing the question with the third set of tokens representing the rejected response and storing the pair as a linked entry in a database or data structure for subsequent DPO analysis.

Block 210 includes the application 104(1) extracting, from the language model 104(2), a first embedding for the accepted question-response pair and a second embedding for the rejected question-response pair. A first embedding for the accepted question-response pair may comprise a first set of vectors, wherein each vector in the first set of vectors further comprises at least one numeric value representing a semantic relationship between a token in the second set of one or more tokens and a token in the first set of one or more tokens. Table 1 depicts an example first embedding comprising a first set of vectors for the second set of one or more tokens.

TABLE 1

| First Set of One or More Tokens (t₁) | | | | | |
|---|---|---|---|---|---|
| | | $t_{11}$ | $t_{12}$ | $t_{13}$ | $\cdots$ | $t_{1i}$ |
| Second Set of One or More Tokens (t₂) | $t_{21}$ | $v_{21\_11}$ | $v_{21\_12}$ | $v_{21\_13}$ | $\cdots$ | $v_{21\_1i}$ |
| | $t_{22}$ | $v_{22\_11}$ | $v_{22\_12}$ | $v_{22\_13}$ | $\cdots$ | $v_{22\_1i}$ |
| | $\cdots$ | $\cdots$ | $\cdots$ | $\cdots$ | $\cdots$ | $\cdots$ |
| | $t_{2j}$ | $v_{2j\_11}$ | $v_{2j\_12}$ | $v_{2j\_13}$ | $\cdots$ | $v_{2j\_1i}$ |

In the above table, the first set of one or more tokens $(t_1)$ may contain i number of tokens and the second set of one or more tokens $(t_2)$ may contain j number of tokens. Each vector for each token in the second set of tokens (e.g., $t_{21}$, $t_{22}$, ..., $t_{2j}$) may comprise a set of values that quantify the semantic relationships between the token and each token in the first set of one or more tokens. For example, a vector for token, $t_{21}$, comprises values representing the semantic relationships between the first token $(t_{21})$ in the second set of one or more tokens $(t_2)$ and each token (e.g., $t_{11}$, $t_{12}$, $t_{13}$, ..., $t_{1i}$) in the first set of one or more tokens $(t_1)$. A second embedding for the rejected question-response pair may comprise a second set of vectors, wherein each vector in the second set of vectors further comprises at least one numeric value representing a semantic relationship between a token in the third set of one or more tokens and a token in the first set of one or more tokens. Table 2 depicts an example second embedding comprising a second set of vectors for the third set of one or more tokens.

TABLE 2

| First Set of One or More Tokens (t₁) | | | | | |
|---|---|---|---|---|---|
| | | $t_{11}$ | $t_{12}$ | $t_{13}$ | $\cdots$ | $t_{1i}$ |
| Third Set of One or More Tokens (t₃) | $t_{31}$ | $v_{31\_11}$ | $v_{31\_12}$ | $v_{31\_13}$ | $\cdots$ | $v_{31\_1i}$ |
| | $t_{32}$ | $v_{32\_11}$ | $v_{32\_12}$ | $v_{32\_13}$ | $\cdots$ | $v_{32\_1i}$ |
| | $\cdots$ | $\cdots$ | $\cdots$ | $\cdots$ | $\cdots$ | $\cdots$ |
| | $t_{3j}$ | $v_{3j\_11}$ | $v_{3j\_12}$ | $v_{3j\_13}$ | $\cdots$ | $v_{3j\_1i}$ |

In the above table, the first set of one or more tokens $(t_1)$ may contain i number of tokens and the third set of one or more tokens $(t_3)$ may contain j number of tokens. Each vector for each token in the third set of tokens (e.g., $t_{31}$, $t_{32}$, ..., $t_{3j}$) may comprise a set of values that quantify the semantic relationships between the token and each token in the first set of one or more tokens. For example, a vector for token, $t_{31}$, comprises values representing the semantic relationships between the first token $(t_{31})$ in the third set of one or more tokens $(t_3)$ and each token (e.g., $t_{11}$, $t_{12}$, $t_{13}$, ..., $t_{1i}$) in the first set of one or more tokens $(t_1)$. In some aspects, the application 104(1) may extract the first and second embeddings from a last hidden layer of the language model 104(2) without obtaining a final output from the language model 104(2) regarding the accepted question-response pair or the rejected question-response pair. The last hidden layer of an LLM is the final layer of neural network computations before the output layer that produces the final predictions. For example, in a model with 32 layers, the last hidden layer would be the output of layer 32, containing the final contextualized representations before the vocabulary projection that determines which token to generate next.

Turning to FIG. 2B, block 212 includes application 104(1) computing a similarity score for the accepted question-response pair and the rejected question-response pair using the first embedding and the second embedding. In some aspects, the application 104(1) may compute the similarity score by computing a cosine similarity between the first embedding and the second embedding. For each vector in the first embedding, application 104(1) may compute the cosine similarity with each vector in the second embedding. A cosine similarity (or cosine of the angle) between two vectors, x and y, can be calculated by dividing the dot product of the two vectors by the product of their magnitudes, as shown in the following equation:

$$\text{Cos}(\theta) = \frac{x \cdot y}{(\|x\| * \|y\|)} \qquad \text{(Eq. 1)}$$

To compute a similarity score, the application 104(1) may further aggregate the pairwise cosine similarities between the vector(s) of the first embedding and the vector(s) of the second embedding by calculating a sum of the pairwise cosine similarities, an average of the pairwise cosine similarities, or a weighted average of the pairwise cosine similarities. Alternatively, application 104(1) may arrive at a similarity score by identifying the maximum cosine similarity among all pairwise cosine similarities between the vector(s) of the first embedding and the vector(s) of the second embedding.

In other aspects, application 104(1) may derive a similarity score by computing Euclidean distances between vector(s) of the first embedding and vector(s) of the second embedding. For each vector in the first embedding, application 104(1) may calculate the Euclidean distance with each vector in the second embedding. The Euclidean distance between two vectors, x and y, can be calculated using the following equation:

$$D(x, y) = \sqrt{\sum_1^i (x_i - y_i)^2} \qquad \text{(Eq. 2)}$$

Application 104(1) may calculate a similarity score by aggregating the pairwise Euclidean distances between the vector(s) of the first embedding and the vector(s) of the second embedding. For example, the application 104(1) may calculate an average of the pairwise cosine similarities, or a weighted average of the pairwise cosine similarities. Alternatively, application 104(1) may derive a similarity score by identifying the minimum pairwise Euclidean distance representing two vectors with the smallest distance between them or the maximum pairwise Euclidean distance representing two vectors with the greatest distance between them.

In other aspects, application 104(1) may derive a similarity score by computing n-gram parameters for the first embedding and the second embedding. An n-gram is a sequence of adjacent items (e.g., words, tokens, symbols, punctuation, etc.) taken from a broader sample of text or speech, wherein a number of the adjacent items is defined by the parameter, n. Unlike vectors in the first or second embeddings, which provide information about individual tokens or words, n-grams may provide information (e.g., contextual information) about word sequences. Such information can be used to build more accurate and context-aware models. Here, application 104(1) may generate a first n-gram embedding by identifying one or more n-grams in each vector of the first embedding and aggregating (e.g., finding an average of) the values of each n-gram of the one or more identified n-grams in the vector. The application 104(1) may identify one or more n-grams in a vector using a window that has a size defined by the parameter, n, and that shifts incrementally across the vector until the window reaches the end of the vector. For example, in a vector having nine elements {$v_a$, $v_b$, $v_c$, $v_d$, $v_e$, $v_f$, $v_g$, $v_h$, $v_i$} and n parameter of 5, the application 104(1) may identify at least five n-grams: ($v_a$, $v_b$, $v_c$, $v_d$, $v_e$), ($v_b$, $v_c$, $v_d$, $v_e$, $v_f$), ($v_c$, $v_d$, $v_e$, $v_f$, $v_g$), ($v_d$, $v_e$, $v_f$, $v_g$, $v_h$), and ($v_e$, $v_f$, $v_g$, $v_h$, $v_i$). Application 104(1) may also generate a second n-gram embedding by identifying one or more n-grams in each vector of the second embedding and aggregating the values of each n-gram of the one or more identified n-grams in the vector. The application 104(1) may derive a similarity score by computing the cosine similarity or Euclidean distance between the first n-gram embedding and the second n-gram embedding, as described in equations 1 and 2, respectively.

Alternatively, the application 104(1) may derive a similarity score by first identifying n-grams in the first, second, and third sets of one or more tokens to generate a first set of one or more n-grams from the first set of one or more tokens, a second set of one or more n-grams from the second set of one or more tokens, and a third set of one or more n-grams from the third set of one or more tokens. The application 104(1) may construct an accepted question-response pair using the first set of one or more n-grams and the second set of one or more n-grams. Application 104(1) may further construct a rejected question-response pair using the first set of one or more n-grams and the third set of one or more n-grams. The application 104(1) may further extract a first n-gram embedding for the accepted question-response pair and a second n-gram embedding for the rejected question-response pair from the language model 104(2). Finally, application 104(1) may derive a similarity score by computing the cosine similarity or Euclidean distance between the first n-gram embedding and the second n-gram embedding, as described in equations 1 and 2, respectively.

In yet other aspects, application 104(1) may obtain a similarity score by applying a second language model to the first embedding and the second embedding. The second language model may comprise a reasoning model. Furthermore, like language model 104(2), the second language model may also be implemented as a microservice (e.g., a microservice 104 operating on host 102 of FIG. 1). Application 104(1) may transmit a prompt requesting a similarity score for the first embedding and the second embedding. The second language model may respond to the prompt by transmitting a similarity score, or intermediate data from which a similarity score can be generated, to the application 104(1).

Block 214 includes application 104(1) determining whether the similarity score satisfies a threshold. The threshold indicates a minimum acceptable similarity score. In some aspects, satisfying the threshold indicates that the accepted question-response pair and the rejected question-response pair are associated with at least a threshold level of similarity to one another. The threshold may be defined manually (e.g., by a user) or automatically by application 104(1). If the similarity score fails to satisfy the threshold, method 200 may proceed to block 216, which includes the application 104(1) excluding the rejected question-response pair from a dataset. However, if the similarity score satisfies (e.g., meets or exceeds) the threshold, method 200 may proceed to block 218, which includes the application 104(1) including the rejected question-response pair in the dataset.

Block 220 includes application 104(1) training the language model using the dataset. In some aspects, training may comprise performing DPO using the dataset. DPO may entail optimizing a language model policy to minimize a cross-entropy loss function using the dataset obtained at block 214. In some scenarios, the cross-entropy loss function may be defined using the following equation:

$$\mathcal{L}_{DPO}(\pi_\theta, \pi_{ref}) = \qquad \text{(Eq. 3)}$$
$$-E_{(x, y_w, y_l) \sim D}\left[ \log \sigma \left( \beta \log \left( \left( \frac{\pi_\theta(y_w|x)}{\pi_{ref}(y_w|x)} \right) \right) - \beta \log \left( \left( \frac{\pi_\theta(y_l|x)}{\pi_{ref}(y_l|x)} \right) \right) \right) \right]$$

where $\pi_\theta$ is a language model policy, $\pi_{ref}$ is a base reference policy indicating baseline model behavior, D represents a dataset of labeled answers to one or more questions and may be expressed as

11

$$D = \{x^{(i)}, y_w^{(i)}, y_l^{(i)}\} \; i = 1 \to n,$$

wherein $x^{(i)}$ are the one or more questions, $$y_w^{(i)}$$

are the accepted answers, $$y_l^{(i)}$$

are the rejected answers, σ is a logistic function, and β is a parameter controlling the deviation from the base reference policy. DPO may further include using feedback from the cross-entropy loss function to adjust one or more model parameters of the LLM to increase the probability of outputting a preferred response to a question and decrease the probability of outputting a non-preferred response to the question.

Figure 3:
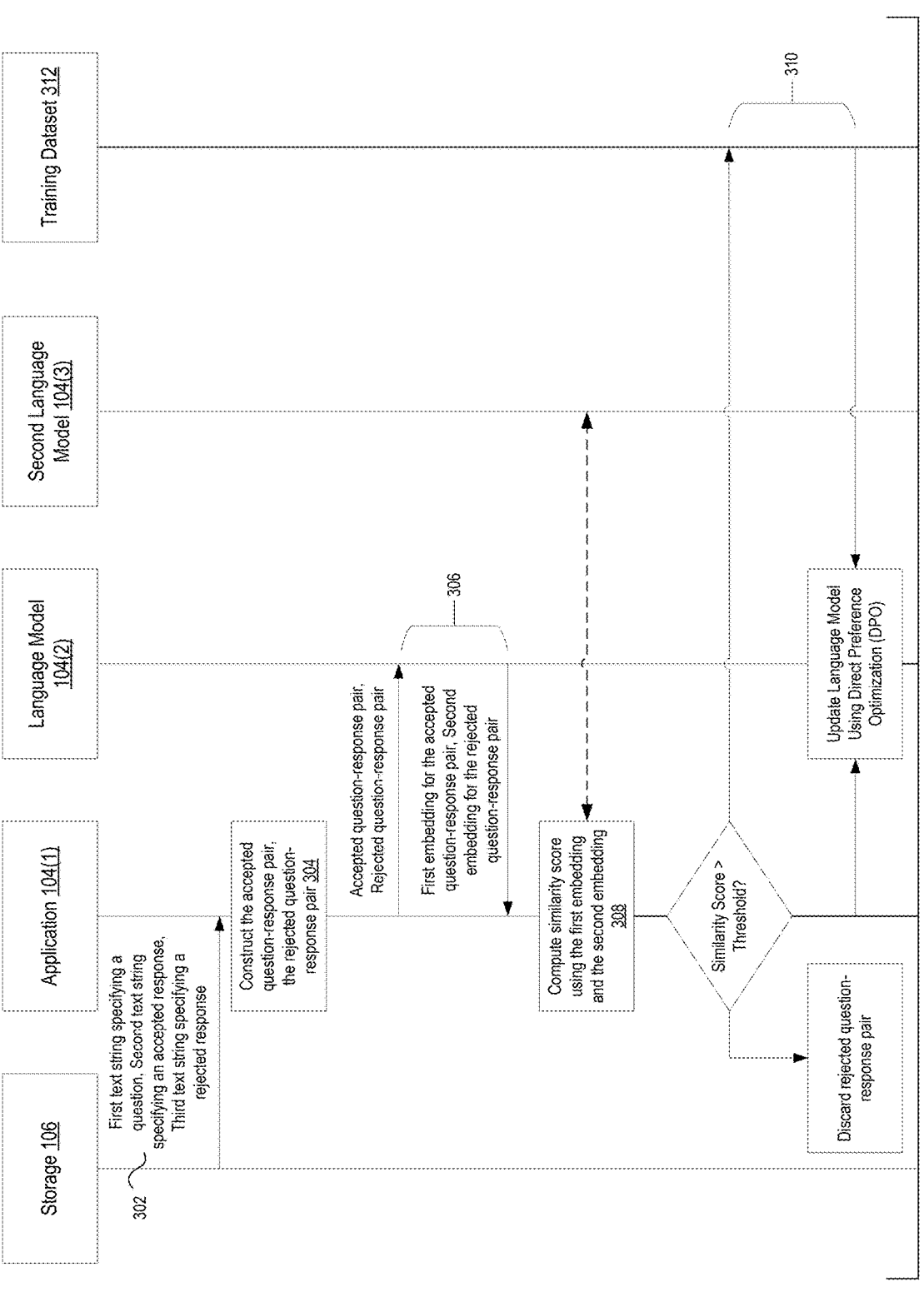
FIG. 3 illustrates an example method for filtering data for direct preference optimization (DPO) training via answer similarity using language model embeddings, in accordance with aspects of the disclosure.

FIG. 3 displays an example message flow diagram 300 between components of the example system 100 for filtering data for direct preference optimization (DPO) training via answer similarity using language model embeddings, in accordance with aspects of the disclosure. In some aspects, communication between the storage 106, application 104(1), the language model 104(2), a second language model 104 (3), and a training data set 316 may be facilitated by one or more APIs.

Message flow diagram 300 may begin with message flow 302, which includes application 104(1) receiving a first text string specifying a question, a second text string specifying an accepted response, and a third text string specifying a rejected response from storage 106. In some aspects, storage 106 may store a dataset comprising a plurality of questions received by the language model 104(1), accepted or preferred responses selected by the language model 104(1) from responses to the plurality of questions generated by the language model 104(1), and rejected or non-preferred responses not selected by the language model 104(1) from the responses to the plurality of questions generated by the language model 104(1).

Message flow 304 includes application 104(1) constructing an accepted question-response pair and a rejected question-response pair. In some aspects, the backend application may tokenize the first, second, and third strings into a first set of one or more tokens, a second set of one or more tokens, and a third set of one or more tokens, respectively. The backend application 304 may construct the accepted question-response pair using the first set of one or more tokens and the second set of one or more tokens and construct the rejected question-response pair using the first set of one or more tokens and the third set of one or more tokens.

Message flow 306 includes application 104(1) submitting the accepted question-response pair and the rejected question-response pair to the language model 104(2). The accepted question-response pair and the rejected question-response pair may be submitted as part of a query requesting an embedding for each pair. The language model 104(2) may respond to the query by transmitting a first embedding for the accepted question-response pair and a second embedding for the rejected question-response pair to the application 104(1).

Message flow 308 includes application 104(1) computing a similarity score for the accepted question-response pair and the rejected question-response pair using the first embedding and the second embedding. In some aspects, application 104(1) may compute the similarity score by calculating the cosine similarity between the first embedding and the second embedding, as described in Equation 1. In other aspects, application 104(1) may compute the similarity score by calculating the Euclidean distance between the first embedding and the second embedding, as described in Equation 2. Alternatively, as shown in message flow 308A, the application 104(1) may transmit a query comprising the first embedding and the second embedding to a second language model 104(3) configured to generate a similarity score using the first embedding and the second embedding. Message flow 308A further includes application 104(1) receiving the similarity score from the second language model 104(3).

Message flow 310 includes application 104(1) determining whether the similarity satisfies a threshold. If the similarity score fails to satisfy the threshold, message flow 310 may include the application 104(1) discarding the rejected question-response pair. However, if the similarity score satisfies the threshold, message flow 310 may include the application 104(1) including the accepted question-response pair and the rejected question-response pair in the training dataset 312. Message flow 310 may further include the application 104(1) updating the language model 104(2) using DPO. As previously described, DPO may include optimizing a language model policy to minimize a cross-entropy loss function described in Equation 3 using the training dataset 312. DPO may further include using feedback from the loss function to adjust one or more model parameters of the LLM to increase the probability of outputting a preferred response to a question and decrease the probability of outputting a non-preferred response to the question.

In some aspects, the application 104(1) may further iterate through the plurality of questions, accepted responses to the plurality of questions, and rejected responses to the plurality of questions in storage 106 and repeat the above message flows 302, 304, 306, 308, and 310 until all data (e.g., accepted question-response pairs and rejected question-response pairs) has been evaluated.

Example Method for Training a Language Model

FIG. 4 depicts an example method 400 for training a language model. In one aspect, method 400 can be implemented by the processing system 500 of FIG. 5.

Method 400 begins at block 405 with inputting an accepted question-response pair and a rejected question-response pair into a language model, as depicted and described with respect to message flow 306 of FIG. 3.

Method 400 then proceeds to block 410 with extracting, from the language model, a first embedding for the accepted question-response pair and a second embedding for the rejected question-response pair, as depicted and described with respect to block 210 of FIG. 2A and message flow 306 of FIG. 3.

Method 400 then proceeds to block 415 with computing, using the first embedding and the second embedding, a similarity score for the accepted question-response pair and the rejected question-response pair, as depicted and described with respect to block 212 of FIG. 2B and message flow 306 of FIG. 3.

Method 400 then proceeds to block 420 with selecting, for inclusion in a dataset, the rejected question-response pair based on the similarity score satisfying a threshold, as depicted and described with respect to blocks 214 and 218 of FIG. 2B and message flow 310 of FIG. 3.

Method 400 then proceeds to block 425 with training the language model using the dataset, as depicted and described with respect to block 220 of FIG. 2B and message flow 310 of FIG. 3.

In some aspects, the extracting further comprises extracting the first embedding and the second embedding from a last hidden layer of the language model.

In some aspects, method 400 further includes receiving (e.g., by receiving component 524 of FIG. 5), from one or more data sources, a first text string specifying a question, a second text string specifying an accepted response, and a third text string specifying a rejected response, as depicted and described at block 202 of FIG. 2A and message flow 302 of FIG. 3. As previously described, the accepted question-response pair and the rejected question-response pair are based on one or more of the first text string, the second text string, or the third text string.

In some aspects, method 400 further includes tokenizing (e.g., by tokenizing component 526 of FIG. 5) the first text string into a first set of one or more tokens, as depicted and described at block 204 of FIG. 2A.

In some aspects, method 400 further includes tokenizing (e.g., by tokenizing component 526 of FIG. 5) the second text string into a second set of one or more tokens, as depicted and described at block 204 of FIG. 2A.

In some aspects, method 400 further includes tokenizing (e.g., by tokenizing component 526 of FIG. 5) the third text string into a third set of one or more tokens, as depicted and described at block 204 of FIG. 2A.

In some aspects, method 400 further includes constructing (e.g., by constructing component 528 of FIG. 5) the accepted question-response pair using the first set of one or more tokens and the second set of one or more tokens, as depicted and described at block 206 of FIG. 2A and message flow 304 of FIG. 3.

In some aspects, method 400 further includes constructing (e.g., by constructing component 528 of FIG. 5) the rejected question-response pair using the first set of one or more tokens and the third set of one or more tokens, as depicted and described at block 206 of FIG. 2A and message flow 304 of FIG. 3.

In some aspects, the first embedding comprises a first set of vectors, wherein a vector of the first set of vectors further comprises at least one numeric value representing a semantic relationship between a token in the second set of one or more tokens and a token in the first set of one or more tokens; and the second embedding comprises a second set of vectors, wherein a vector of the second set of vectors further comprises at least one numeric value representing a semantic relationship between a token in the third set of one or more tokens and a token in the first set of one or more tokens.

In some aspects, computing the similarity score for the accepted question-response pair and the rejected question-response pair comprises one or more of: (i) computing a cosine similarity between the first embedding and the second embedding; (ii) computing Euclidean distance between the first embedding and the second embedding; or (iii) computing n-gram parameters for the first embedding and the second embedding.

In some aspects, computing the similarity score for the accepted question-response pair and the rejected question-response pair comprises applying (e.g., by applying component 530 of FIG. 5) a second language model to the first embedding and the second embedding.

In some aspects, method 400 further includes determining (e.g., by determining component 532 of FIG. 5) that a second similarity score for the accepted question-response pair and a rejected question-response pair fails to satisfy the threshold.

In some aspects, method 400 further includes excluding (e.g., by excluding component 534 of FIG. 5) the second rejected question-response pair from the dataset.

In some aspects, training the language model using the dataset comprises performing (e.g., by performing component 536 of FIG. 5) direct preference optimization.

In some aspects, the language model is an unsupervised language model and performing the direct preference optimization comprises adjusting (e.g., by adjusting component 538 of FIG. 5) one or more model parameters based on a cross-entropy loss function and a reference policy that indicates a baseline model behavior.

In some aspects, extracting the first embedding and the second embedding comprises extracting the first embedding and the second embedding without obtaining a final output of the language model regarding the accepted question-response pair or the rejected question-response pair.

In some aspects, the similarity score satisfying the threshold indicates that the accepted question-response pair and the rejected question-response pair are associated with at least a threshold level of similarity to one another.

In some aspects, method 400 enables stronger preference learning signals and improves model stability by removing noisy training pairs without needing additional annotation, as required in RLHF training. Such technical effects may be attributable to the aforementioned techniques and apparatuses, for example, due to the application 104(1) computing a similarity score for an accepted question-response pair and a rejected question-response pair based on a first embedding for the accepted question-response pair and a second embedding for the question-response pair extracted from a language model 104(2) and determining whether to include the rejected question-response pair in a training dataset based on a comparison of the similarity score to a threshold. If the similarity score meets or exceeds the threshold, the backend application may include the rejected question-response pair in the training dataset. Otherwise, application 104(1) may exclude the rejected question-response pair from the training dataset. Application 104(1) may further update the language model using the training dataset.

Note that FIG. 4 is just one example of a method, and other methods including fewer, additional, or alternative operations are possible consistent with this disclosure.

Example Processing System for Training a Language Model

Figure 5:
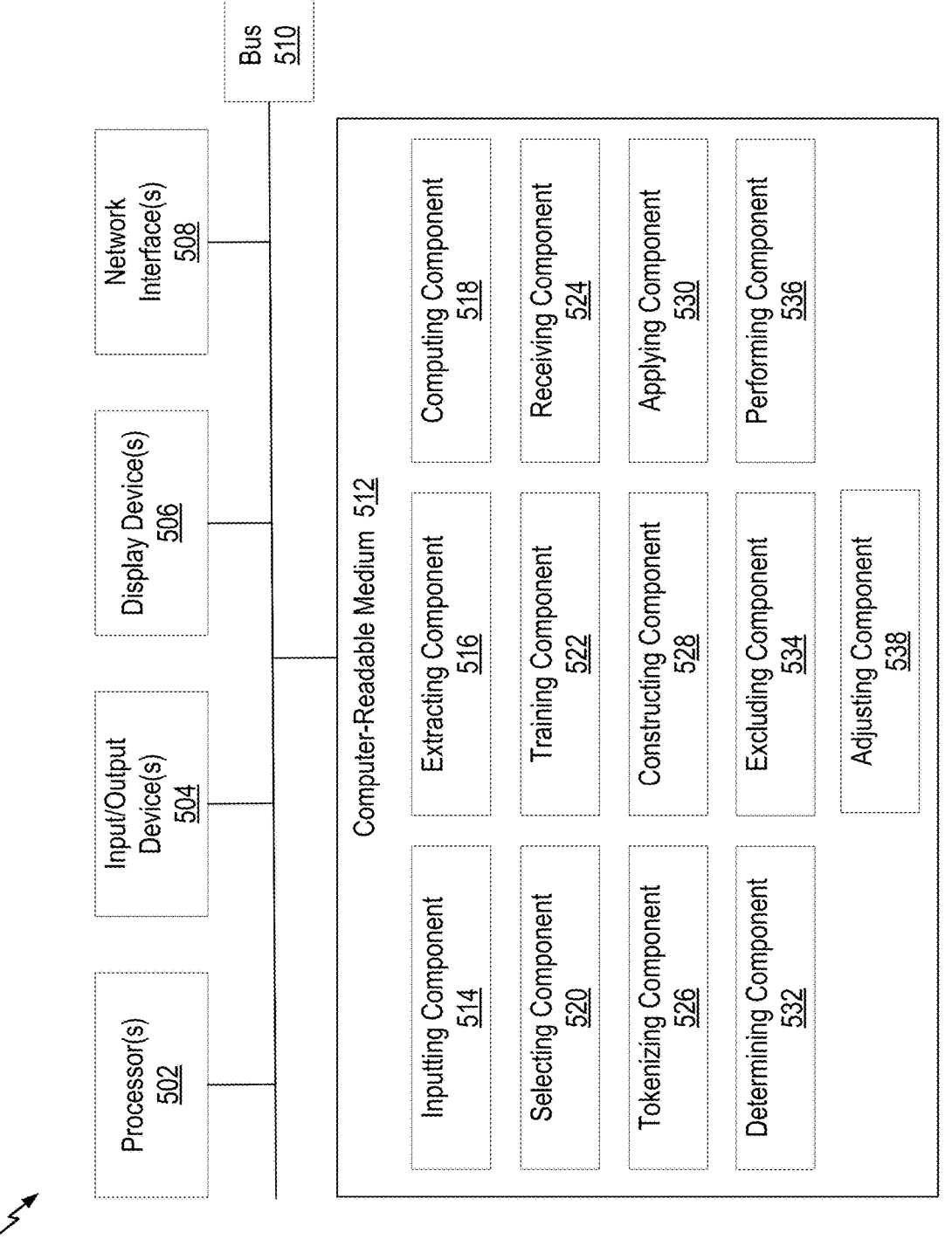
FIG. 5 depicts an example processing system with which aspects of the present disclosure can be performed.

FIG. 5 depicts an example processing system 500 configured to perform various aspects described herein, including, for example, method 400 as described above with respect to FIG. 4.

Processing system 500 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 500 includes one or more processors 502, one or more input/output devices 504, one or more display devices 506, one or more network interfaces 508 through which processing system 500 is connected to one or more networks (e.g., a local network, an intranet, the Internet, or any other group of processing systems communicatively connected to each other), and computer-readable medium 512. In the depicted example, the aforementioned components are coupled by a bus 510, which may generally be configured for data exchange amongst the components. Bus 510 may be representative of multiple buses, while only one is depicted for simplicity.

Processor(s) 502 are generally configured to retrieve and execute instructions stored in one or more memories, including local memories like computer-readable medium 512, as well as remote memories and data stores. Similarly, processor(s) 502 are configured to store application data residing in local memories like the computer-readable medium 512, as well as remote memories and data stores. More generally, bus 510 is configured to transmit programming instructions and application data among the processor(s) 502, display device(s) 506, network interface(s) 508, and/or computer-readable medium 512. In certain embodiments, processor(s) 502 are representative of one or more central processing units (CPUs), graphics processing unit (GPUs), tensor processing unit (TPUs), accelerators, and other processing devices.

Input/output device(s) 504 may include any device, mechanism, system, interactive display, and/or various other hardware and software components for communicating information between processing system 500 and a user of processing system 500. For example, input/output device(s) 504 may include input hardware, such as a keyboard, touch screen, button, microphone, speaker, and/or other device for receiving inputs from the user and sending outputs to the user.

Display device(s) 506 may generally include any sort of device configured to display data, information, graphics, user interface elements, and the like to a user. For example, display device(s) 506 may include internal and external displays such as an internal display of a tablet computer or an external display for a server computer or a projector. Display device(s) 506 may further include displays for devices, such as augmented, virtual, and/or extended reality devices. In various embodiments, display device(s) 516 may be configured to display a graphical user interface.

Network interface(s) 508 provide processing system 500 with access to external networks and thereby to external processing systems. Network interface(s) 508 can generally be any hardware and/or software capable of transmitting and/or receiving data via a wired or wireless network connection. Accordingly, network interface(s) 508 can include a communication transceiver for sending and/or receiving any wired and/or wireless communication.

Computer-readable medium 512 may be a volatile memory, such as a random access memory (RAM), or a nonvolatile memory, such as nonvolatile random access memory (NVRAM), or the like. In this example, computer-readable medium 512 includes inputting component 514, extracting component 516, computing component 518, selecting component 520, training component 522, receiving component 524, tokenizing component 526, constructing component 528, applying component 530, determining component 532, excluding component 534, performing component 536, and adjusting component 538. Processing of the components 514-538 may enable and cause the processing system 500 to perform the method 400 described with respect to FIG. 4, or any aspect related to it.

In certain embodiments, inputting component 514 is configured to input an accepted question-response pair and a rejected question-response pair into a language model, as described in FIG. 4 with reference to block 405. In certain embodiments, extracting component 516 is configured to extract, from the language model, a first embedding for the accepted question-response pair and a second embedding for the rejected question-response pair, as described in FIG. 4 with reference to block 410. In certain embodiments, computing component 518 is configured to compute, using the first embedding and the second embedding, a similarity score for the accepted question-response pair and the rejected question-response pair, as described in FIG. 4 with reference to block 415. In certain embodiments, selecting component 520 is configured to select, for inclusion in a dataset, the rejected question-response pair based on the similarity score satisfying a threshold, as described in FIG. 4 with reference to block 420. In certain embodiments, training component 522 is configured to train the language model using the dataset, as described in FIG. 4 with reference to block 425.

Note that FIG. 5 is just one example of a processing system consistent with aspects described herein, and other processing systems having additional, alternative, or fewer components are possible consistent with this disclosure.
Example Method for Updating a Language Model FIG. 6 depicts an example method 600 for updating a language model. In one aspect, method 600 can be implemented by the processing system 700 of FIG. 7.

Method 600 begins at block 605 with inputting an accepted question-response pair and a rejected question-response pair into a language model, as depicted and described with respect to message flow 306 of FIG. 3 and block 405 of FIG. 4.

Method 600 then proceeds to block 610 with extracting, from the language model, a first embedding for the accepted question-response pair and a second embedding for the rejected question-response pair, as depicted and described with respect to block 210 of FIG. 2A, message flow 306 of FIG. 3, and block 410 of FIG. 4.

Method 600 then proceeds to block 615 with computing, using the first embedding and the second embedding, a similarity score for the accepted question-response pair and the rejected question-response pair, as depicted and described with respect to block 212 of FIG. 2B, message flow 306 of FIG. 3, and block 415 of FIG. 4.

Method 600 then proceeds to block 620 with determining the similarity score satisfies a threshold, as depicted and described with respect to blocks 214, 216, and 218 of FIG. 2B, message flow 310 of FIG. 3, and block 420 of FIG. 4.

Method 600 then proceeds to block 625 with applying direct preference optimization based on the rejected question-response to update the language model, as depicted and described with respect to message flow 310 of FIG. 3.

In some aspects, method 600 enables stronger preference learning signals and improves model stability by removing noisy training pairs without needing additional annotation, as required in RLHF training. Such technical effects may be attributable to the aforementioned techniques and apparatuses, for example, due to the application 104(1) computing a similarity score for an accepted question-response pair and a rejected question-response pair based on a first embedding for the accepted question-response pair and a second embedding for the question-response pair extracted from a language model 104(2) and determining whether to include the rejected question-response pair in a training dataset based on a comparison of the similarity score to a threshold. If the similarity score meets or exceeds the threshold, the backend application may include the rejected question-response pair in the training dataset. Otherwise, application 104(1) may exclude the rejected question-response pair from the training dataset. Application 104(1) may further update the language model using DPO and the training dataset.

Note that FIG. 6 is just one example of a method, and other methods including fewer, additional, or alternative operations are possible consistent with this disclosure.

Example Processing System for Updating a Language Model

Figure 7:
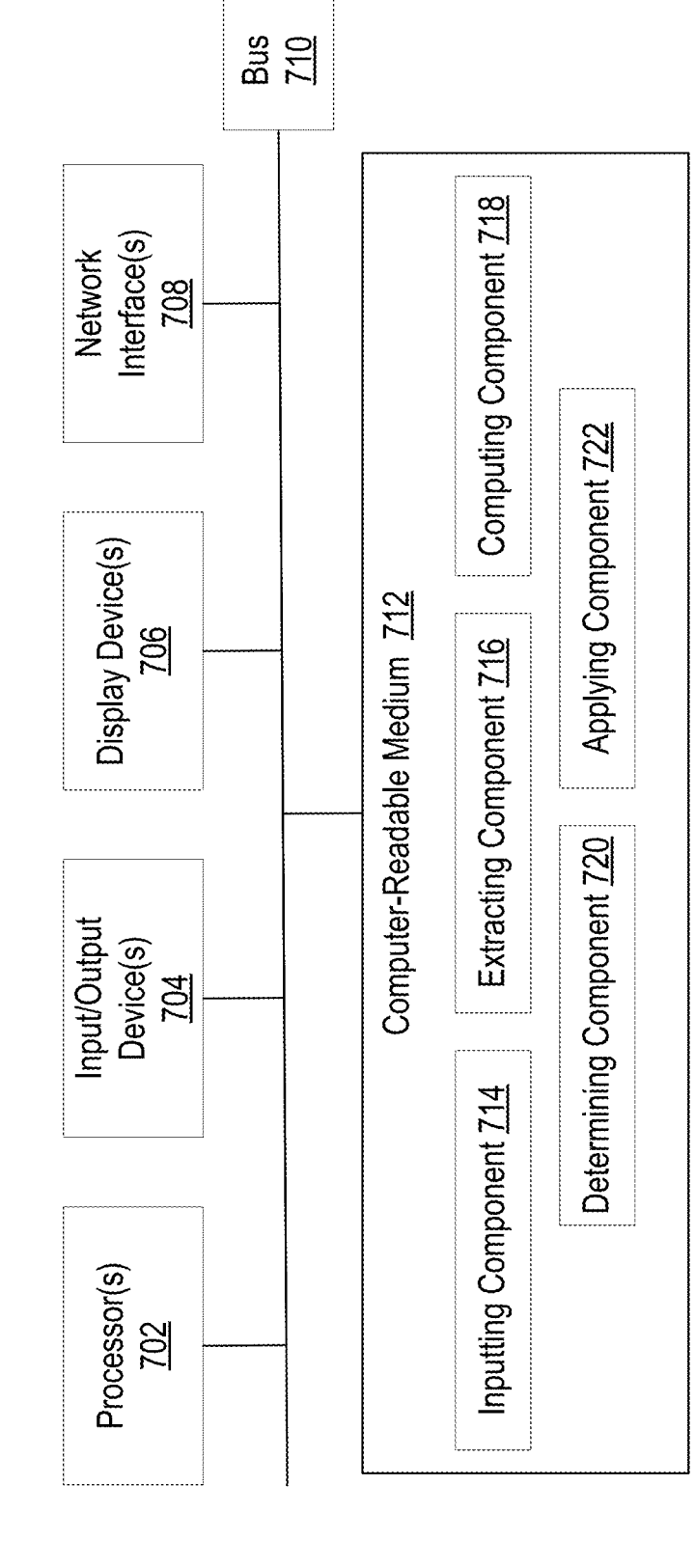
FIG. 7 depicts an example processing system with which aspects of the present disclosure can be performed.

FIG. 7 depicts an example processing system 700 configured to perform various aspects described herein, including, for example, method 600 as described above with respect to FIG. 6.

Processing system 700 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, one or more network interfaces 708 through which processing system 700 is connected to one or more networks (e.g., a local network, an intranet, the Internet, or any other group of processing systems communicatively connected to each other), and computer-readable medium 712. In the depicted example, the aforementioned components are coupled by a bus 710, which may generally be configured for data exchange amongst the components. Bus 710 may be representative of multiple buses, while only one is depicted for simplicity.

Processor(s) 702 are generally configured to retrieve and execute instructions stored in one or more memories, including local memories like computer-readable medium 712, as well as remote memories and data stores. Similarly, processor(s) 702 are configured to store application data residing in local memories like the computer-readable medium 712, as well as remote memories and data stores. More generally, bus 710 is configured to transmit programming instructions and application data among the processor(s) 702, display device(s) 706, network interface(s) 708, and/or computer-readable medium 712. In certain embodiments, processor(s) 702 are representative of one or more central processing units (CPUs), graphics processing unit (GPUs), tensor processing unit (TPUs), accelerators, and other processing devices.

Input/output device(s) 704 may include any device, mechanism, system, interactive display, and/or various other hardware and software components for communicating information between processing system 700 and a user of processing system 700. For example, input/output device(s) 704 may include input hardware, such as a keyboard, touch screen, button, microphone, speaker, and/or other device for receiving inputs from the user and sending outputs to the user.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices. In various embodiments, display device(s) 706 may be configured to display a graphical user interface.

Network interface(s) 708 provide processing system 700 with access to external networks and thereby to external processing systems. Network interface(s) 708 can generally be any hardware and/or software capable of transmitting and/or receiving data via a wired or wireless network connection. Accordingly, network interface(s) 708 can include a communication transceiver for sending and/or receiving any wired and/or wireless communication.

Computer-readable medium 712 may be a volatile memory, such as a random access memory (RAM), or a nonvolatile memory, such as nonvolatile random access memory (NVRAM), or the like. In this example, computer-readable medium 712 includes inputting component 714, extracting component 716, computing component 718, determining component 720, and applying component 722. Processing of the components 714-722 may enable and cause the processing system 700 to perform the method 600 described with respect to FIG. 6, or any aspect related to it.

In certain embodiments, inputting component 714 is configured to input an accepted question-response pair and a rejected question-response pair into a language model, as described in FIG. 6 with reference to block 605. In certain embodiments, extracting component 716 is configured to extract, from the language model, a first embedding for the accepted question-response pair and a second embedding for the rejected question-response pair, as described in FIG. 6 with reference to block 610. In certain embodiments, computing component 718 is configured to compute, using the first embedding and the second embedding, a similarity score for the accepted question-response pair and the rejected question-response pair, as described in FIG. 6 with reference to block 615. In certain embodiments, determining component 720 is configured to determine the similarity score satisfies a threshold, as described in FIG. 6 with reference to block 620. In certain embodiments, applying component 722 is configured to apply direct preference optimization based on the rejected question-response to update the language model, as described in FIG. 6 with reference to block 625.

Note that FIG. 7 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A computer-implemented method, comprising: inputting an accepted question-response pair and a rejected question-response pair into a language model; extracting, from the language model, a first embedding for the accepted question-response pair and a second embedding for the rejected question-response pair; computing, using the first embedding and the second embedding, a similarity score for the accepted question-response pair and the rejected question-response pair; selecting, for inclusion in a dataset, the rejected question-response pair based on the similarity score satisfying a threshold; and training the language model using the dataset.

Clause 2: The method of Clause 1, wherein the extracting further comprises extracting the first embedding and the second embedding from a last hidden layer of the language model.

Clause 3: The computer-implemented method of any one of Clauses 1-2, further comprising: receiving, from one or more data sources, a first text string specifying a question, a second text string specifying an accepted response, and a third text string specifying a rejected response, wherein the accepted question-response pair and the rejected question-response pair are based on one or more of the first text string, the second text string, or the third text string.

Clause 4: The computer-implemented method of Clause 3, further comprising: tokenizing the first text string into a first set of one or more tokens; tokenizing the second text string into a second set of one or more tokens; and tokenizing the third text string into a third set of one or more tokens.

Clause 5: The computer-implemented method of Clause 4, further comprising: constructing the accepted question-response pair using the first set of one or more tokens and the second set of one or more tokens; and constructing the rejected question-response pair using the first set of one or more tokens and the third set of one or more tokens.

Clause 6: The method of Clause 5, wherein: the first embedding comprises a first set of vectors, wherein a vector of the first set of vectors further comprises at least one numeric value representing a semantic relationship between a token in the second set of one or more tokens and a token in the first set of one or more tokens; and the second embedding comprises a second set of vectors, wherein a vector of the second set of vectors further comprises at least one numeric value representing a semantic relationship between a token in the third set of one or more tokens and a token in the first set of one or more tokens.

Clause 7: The method of any one of Clauses 1-6, wherein computing the similarity score for the accepted question-response pair and the rejected question-response pair comprises one or more of: (i) computing a cosine similarity between the first embedding and the second embedding; (ii) computing Euclidean distance between the first embedding and the second embedding; or (iii) computing n-gram parameters for the first embedding and the second embedding.

Clause 8: The method of any one of Clauses 1-7, wherein computing the similarity score for the accepted question-response pair and the rejected question-response pair comprises applying a second language model to the first embedding and the second embedding.

Clause 9: The computer-implemented method of any one of Clauses 1-8, further comprising: determining that a second similarity score for the accepted question-response pair and a rejected question-response pair fails to satisfy the threshold; and excluding the second rejected question-response pair from the dataset.

Clause 10: The method of any one of Clauses 1-9, wherein training the language model using the dataset comprises performing direct preference optimization.

Clause 11: The method of Clause 10, wherein the language model is an unsupervised language model and performing the direct preference optimization comprises adjusting one or more model parameters based on a cross-entropy loss function and a reference policy that indicates a baseline model behavior.

Clause 12: The method of any one of Clauses 1-11, wherein extracting the first embedding and the second embedding comprises extracting the first embedding and the second embedding without obtaining a final output of the language model regarding the accepted question-response pair or the rejected question-response pair.

Clause 13: The method of any one of Clauses 1-12, wherein the similarity score satisfying the threshold indicates that the accepted question-response pair and the rejected question-response pair are associated with at least a threshold level of similarity to one another.

Clause 14: A method for wireless communications by an apparatus comprising: inputting an accepted question-response pair and a rejected question-response pair into a language model; extracting, from the language model, a first embedding for the accepted question-response pair and a second embedding for the rejected question-response pair; computing, using the first embedding and the second embedding, a similarity score for the accepted question-response pair and the rejected question-response pair; selecting, for inclusion in a dataset, the rejected question-response pair based on the similarity score satisfying a threshold; and training the language model using the dataset.

Clause 15: The method of Clause 14, further comprising receiving, from one or more data sources, a first text string specifying a question, a second text string specifying an accepted response, and a third text string specifying a rejected response, wherein the accepted question-response pair and the rejected question-response pair are based on one or more of the first text string, the second text string, or the third text string.

Clause 16: The method of Clause 15, further comprising: tokenizing the first text string into a first set of one or more tokens; tokenizing the second text string into a second set of one or more tokens; and tokenizing the third text string into a third set of one or more tokens.

Clause 17: The method of Clause 16, further comprising: constructing the accepted question-response pair using the first set of one or more tokens and the second set of one or more tokens; and constructing the rejected question-response pair using the first set of one or more tokens and the third set of one or more tokens.

Clause 18: The method of Clause 17, wherein: the first embedding comprises a first set of vectors, wherein a vector of the first set of vectors further comprises at least one numeric value representing a semantic relationship between a token in the second set of one or more tokens and a token in the first set of one or more tokens; and the second embedding comprises a second set of vectors, wherein a vector of the second set of vectors further comprises at least one numeric value representing a semantic relationship between a token in the third set of one or more tokens and a token in the first set of one or more tokens.

Clause 19: The method of any one of Clauses 14-18, further comprising computing the similarity score for the accepted question-response pair and the rejected question-response pair by performing one or more of: (i) computing a cosine similarity between the first embedding and the second embedding (ii) computing Euclidean distance between the first embedding and the second embedding (iii) computing n-gram parameters for the first embedding and the second embedding.

Clause 20: A computer-implemented method, comprising: inputting an accepted question-response pair and a rejected question-response pair into a language model; extracting, from the language model, a first embedding for the accepted question-response pair and a second embedding for the rejected question-response pair; computing, using the first embedding and the second embedding, a similarity score for the accepted question-response pair and the rejected question-response pair; determining the similarity score satisfies a threshold; and applying direct preference optimization based on the rejected question-response to update the language model.

Clause 21: A processing system, comprising: memory comprising computer-executable instructions; and one or more processors configured to execute the computer-executable instructions and cause the processing system to perform a method in accordance with any one of Clauses 1-20.

Clause 22: A processing system, comprising means for performing a method in accordance with any one of Clauses 1-21.

Clause 23: A non-transitory computer-readable medium storing program code for causing a processing system to perform the steps of any one of Clauses 1-21.

Clause 24: A computer program product embodied on a computer-readable storage medium comprising code for performing a method in accordance with any one of Clauses 1-21.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:

inputting an accepted question-response pair and a rejected question-response pair into a language model;

extracting, from the language model, a first embedding for the accepted question-response pair comprising a first set of vectors, wherein a vector of the first set of vectors further comprises at least one numeric value representing a semantic relationship between a token in a second set of one or more tokens associated with an accepted response and a token in a first set of one or more tokens associated with a question;

extracting, from the language model, a second embedding for the rejected question-response pair comprising a second set of vectors, wherein a vector of the second set of vectors further comprises at least one numeric value representing semantic relationship between a token in a third set of one or more tokens associated with a rejected response and the token in the first set of one or more tokens associated with the question;

computing, using the first embedding and the second embedding, a similarity score indicating a similarity between the accepted question-response pair and the rejected question-response pair;

selecting, for inclusion in a dataset, the rejected question-response pair based on the similarity score satisfying a threshold, wherein the dataset comprises a plurality of rejected question-response pairs having a minimum level of similarity with a plurality of corresponding accepted question-response pairs; and finetuning, using the dataset, the language model.

2. The computer-implemented method of claim 1, wherein the extracting further comprises extracting the first embedding and the second embedding from a last hidden layer of the language model.

3. The computer-implemented method of claim 1, further comprising:

receiving, from one or more data sources, a first text string specifying the question, a second text string specifying the accepted response, and a third text string specifying the rejected response, wherein the accepted question-response pair and the rejected question-response pair are based on one or more of the first text string, the second text string, or the third text string.

4. The computer-implemented method of claim 3, further comprising:

tokenizing the first text string into the first set of one or more tokens;

tokenizing the second text string into the second set of one or more tokens; and tokenizing the third text string into the third set of one or more tokens.

5. The computer-implemented method of claim 4, further comprising:

constructing the accepted question-response pair using the first set of one or more tokens and the second set of one or more tokens; and constructing the rejected question-response pair using the first set of one or more tokens and the third set of one or more tokens.

6. The computer-implemented method of claim 1, wherein computing the similarity score for the accepted question-response pair and the rejected question-response pair comprises one or more of:

(i) computing a cosine similarity between the first embedding and the second embedding;

(ii) computing Euclidean distance between the first embedding and the second embedding; or (iii) computing n-gram parameters for the first embedding and the second embedding.

7. The computer-implemented method of claim 1, wherein computing the similarity score for the accepted question-response pair and the rejected question-response pair comprises applying a second language model to the first embedding and the second embedding.

8. The computer-implemented method of claim 1, further comprising:

determining that a second similarity score for the accepted question-response pair and a second rejected question-response pair fails to satisfy the threshold; and excluding the second rejected question-response pair from the dataset.

9. The computer-implemented method of claim 1, wherein training the language model using the dataset comprises performing direct preference optimization.

10. The computer-implemented method of claim 9, wherein the language model is an unsupervised language model and performing the direct preference optimization comprises adjusting one or more model parameters based on a cross-entropy loss function and a reference policy that indicates a baseline model behavior.

11. The computer-implemented method of claim 1, wherein extracting the first embedding and the second embedding comprises extracting the first embedding and the second embedding without obtaining a final output of the language model regarding the accepted question-response pair or the rejected question-response pair.

12. The computer-implemented method of claim 1, wherein the accepted response comprises a preferred content item selected from a set of one or more content items generated by the language model according to a criterion comprising at least one of relevance, completeness, or coherence, and wherein the rejected response comprises a non-preferred content item remaining in the set of one or more content items.

13. An apparatus comprising a processing system that includes one or more processors and one or more memories coupled with the one or more processors, the processing system configured to:

input an accepted question-response pair and a rejected question-response pair into a language model;

extract, from the language model, a first embedding for the accepted question-response pair comprising a first set of vectors, wherein a vector of the first set of vectors further comprises at least one numeric value representing a semantic relationship between a token in a second set of one or more tokens associated with an accepted response and a token in a first set of one or more tokens associated with a question;

extract, from the language model, a second embedding for the rejected question-response pair comprising a second set of vectors, wherein a vector of the second set of vectors further comprises at least one numeric value representing a semantic relationship between a token in a third set of one or more tokens associated with a rejected response and the token in the first set of one or more tokens associated with the question;

compute, using the first embedding and the second embedding, a similarity score indicating a similarity between the accepted question-response pair and the rejected question-response pair;

select, for inclusion in a dataset, the rejected question-response pair based on the similarity score satisfying a threshold, wherein the dataset comprises a plurality of rejected question-response pairs having a minimum level of similarity with a plurality of corresponding accepted question-response pairs; and finetuning, using the dataset, the language model.

14. The apparatus of claim 13, wherein the processing system is further configured to receive, from one or more data sources, a first text string specifying the question, a second text string specifying the accepted response, and a third text string specifying the rejected response, wherein the accepted question-response pair and the rejected question-response pair are based on one or more of the first text string, the second text string, or the third text string.

15. The apparatus of claim 14, wherein the processing system is further configured to:

tokenize the first text string into the first set of one or more tokens;

tokenize the second text string into the second set of one or more tokens; and tokenize the third text string into the third set of one or more tokens.

16. The apparatus of claim 15, wherein the processing system is further configured to:

construct the accepted question-response pair using the first set of one or more tokens and the second set of one or more tokens; and construct the rejected question-response pair using the first set of one or more tokens and the third set of one or more tokens.

17. The apparatus of claim 13, wherein the accepted response comprises a preferred content item selected from a set of one or more content items generated by the language model according to a criterion comprising at least one of relevance, completeness, or coherence, and wherein the rejected response comprises a non-preferred content item remaining in the set of one or more content items.

18. The apparatus of claim 13, wherein the processing system is further configured to compute the similarity score for the accepted question-response pair and the rejected question-response pair by performing one or more of:

(i) computing a cosine similarity between the first embedding and the second embedding;

(ii) computing Euclidean distance between the first embedding and the second embedding; or (iii) computing n-gram parameters for the first embedding and the second embedding.

19. A computer-implemented method, comprising:

inputting an accepted question-response pair and a rejected question-response pair into a language model;

extracting, from the language model, a first embedding for the accepted question-response pair comprising a first set of vectors, wherein a vector of the first set of vectors further comprises at least one numeric value representing a semantic relationship between a token in a second set of one or more tokens associated with an accepted response and a token in a first set of one or more tokens associated with a question;

extracting, from the language model a second embedding for the rejected question-response pair comprising a second set of vectors, wherein a vector of the second set of vectors further comprises at least one numeric value representing a semantic relationship between a token in a third set of one or more tokens associated with a rejected response and the token in the first set of one or more tokens associated with the question;

computing, using the first embedding and the second embedding, a similarity score indicating a similarity between the accepted question-response pair and the rejected question-response pair;

determining the similarity score satisfies a threshold, wherein the similarity score satisfying the threshold indicates that the rejected question-response pair is associated with at least a minimum level of similarity to the accepted question-response pair; and updating, by applying direct preference optimization based on the rejected question-response pair, the language model.

20. The computer-implemented method of claim 19, wherein the accepted response comprises a preferred content item selected from a set of one or more content items generated by the language model according to a criterion comprising at least one of relevance, completeness, or coherence, and wherein the rejected response comprises a non-preferred content item remaining in the set of one or more content items.

* * * * *